United States Patent [19]

Jensen et al.

[11] Patent Number: 5,446,677
[45] Date of Patent: Aug. 29, 1995

[54] DIAGNOSTIC SYSTEM FOR USE IN AN ENVIRONMENT CONTROL NETWORK

[75] Inventors: Howard A. Jensen, Mequon; Barrett G. Wainscott, Jr., Waukesha; Donald R. Albinger, New Berlin; Richard H. Monroe, West Milwaukee, all of Wis.

[73] Assignee: Johnson Service Company, Milwaukee, Wis.

[21] Appl. No.: 234,827

[22] Filed: Apr. 28, 1994

[51] Int. Cl.⁶ ............................................. G01F 1/06
[52] U.S. Cl. ................................. 364/510; 236/49.5; 62/93; 62/126; 165/16; 165/100
[58] Field of Search ................. 364/550, 510, 505; 236/49.3, 49.5, 45, 25 R; 62/93, 126, 129; 165/2, 16, 100

[56] References Cited

U.S. PATENT DOCUMENTS

| | | | |
|---|---|---|---|
| 4,549,601 | 10/1985 | Wellman et al. | 165/2 |
| 4,630,670 | 12/1986 | Wellman et al. | 165/16 |
| 5,058,388 | 10/1991 | Shaw et al. | 62/93 |
| 5,071,065 | 12/1991 | Aalto et al. | 236/49.3 |
| 5,311,451 | 5/1994 | Barrett | 364/550 |

*Primary Examiner*—Ellis B. Ramirez
*Assistant Examiner*—Thomas Peeso
*Attorney, Agent, or Firm*—Foley & Lardner

[57] ABSTRACT

The present invention relates to a diagnostic system for use in a network control system. The diagnostic system is preferably utilized to analyze VAV box performance in an environmental control system such as a network facilities management system. The diagnostic system advantageously allows the serviceperson to perform diagnostic tests on VAV boxes from a remote location. Flat box warnings, starved box warnings, box excessive damper hysteresis warnings, oversized box warnings, damper stroke out of bounds warnings, as well as other box and damper warnings may be provided by the diagnostic system. Preferably, the diagnostic system formats the air flow data so that it can be displayed for graphing. The diagnostic system causes individual controls to adjust the damper positions. Air flow parameters for each position are communicated to the remote location.

20 Claims, 4 Drawing Sheets

DIAGNOSTIC SYSTEM FOR USE IN AN ENVIRONMENT CONTROL NETWORK

CROSS REFERENCE TO RELATED APPLICATIONS

The present application is related to U.S. Ser. No. 08/234,827, entitled "Controller for Use in an Environment Control Network Capable of Storing Diagnostic Information", filed Jul. 22, 1994 by Jensen et al., assigned to the assignee of the present invention.

BACKGROUND OF THE INVENTION

The present invention is related to an environmental control system. More particularly, the present invention is related to a diagnostic system for testing dampers or controllers utilized in an environment control network.

Environment control networks or facility management systems are employed in office buildings, manufacturing facilities, and the like, for controlling the internal environment of the facility. The environment control network may be employed to control temperature, airflow, humidity, lighting, or security in the internal environment.

In environment control networks, variable air volume (VAV) boxes are located throughout the facility and provide environmentally controlled air to the internal environment. The controlled air is preferably provided at a particular temperature or humidity so that a comfortable internal environment is established. The air flow of the controlled air is preferably measured in cubic feet per minute (CFM).

The VAV boxes are generally coupled to an air source which supplies the controlled air to the VAV box via duct work. The controlled air is preferably provided through a damper in the VAV box. The damper regulates the amount of the controlled air provided by the VAV box to the internal environment. The damper is generally coupled to an actuator which preferably positions the damper so that appropriate air flow is provided to the internal environment.

A controller is generally associated with each VAV box. The controller receives information related to the air flow and temperature in the internal environment and appropriately positions the actuator so that the VAV box provides the appropriate air flow to the internal environment. The controller may include sophisticated feedback mechanisms such as proportional integrated control (PI control) algorithms. Sophisticated feedback allows the actuator to be positioned more precisely.

The controller may be coupled to a communication bus within the environment control network and is able to communicate with other components within the environment control network. For example, the controller may include circuitry which indicates when the controller has experienced a catastrophic malfunction. A message indicative of this malfunction may be communicated to components within the network across the communication bus. Also, the controllers may receive hazardous warning messages on the communication bus, such as a fire warning. The controller may be configured to close all dampers in response to a fire warning. Thus, the controllers are generally capable of receiving information and messages about other components within the environment control network.

Large buildings typically have hundreds of VAV boxes which are positioned in hard to reach and visually obstructed places. For example, VAV boxes and their associated controllers are often positioned in temporary or plastered ceilings. Components associated with the VAV boxes such as actuators, dampers, sensors and controllers must be repaired when they malfunction. Malfunctioning components associated with VAV boxes may cause the internal environment or portions thereof to become too hot, too cold, too drafty, or too noisy. Heretofore, service people in charge of repairing components associated with the VAV boxes receive complaints of a most general nature about the internal environment and are required to find the VAV boxes which are responsible for the complaints. Finding these boxes among the hundreds of hidden VAV boxes is extremely difficult.

Once found, the service people must uncover the VAV boxes and manually perform diagnostics for the VAV boxes and the associated controllers by manipulating controls on the VAV boxes and controllers. Generally, service people are required to perform a visual inspection to search for mechanical failures. These service people also perform functional tests by coupling the controller to a personal computer and causing the controller to move the damper. The service people visually confirm that the damper is moving properly.

Thus, conventional environment control networks require that service people perform "hands on" diagnostic analysis on individual VAV boxes. "Hands on" diagnostic analysis imposes a relatively severe workload burden on service people because of the increased time required for the service people to find and individually test VAV boxes and associated controllers before discovering the problematic unit. Thus, there is a need for a diagnostic system or tool which is able to test controllers and VAV boxes from a remote location. Further, there is a need for a diagnostic tool which is able to test several controllers and VAV boxes simultaneously.

SUMMARY OF THE INVENTION

The present invention relates to an environment control network including a plurality of box units, a communication bus, and a computer. Each of the plurality of box units includes a controller operatively associated with it. The controller includes a parameter input for receiving a parameter signal and an actuator output for providing an actuator signal. The box unit also includes a damper driven by an actuator coupled with the actuator output. The damper controls air flow to an environment. The controller provides the actuator signal at the actuator output. The communication bus is coupled to each controller. The computer is operatively coupled with the communication bus and is configured to cause the controller to provide a particular actuator signal at the actuator output and to receive a particular parameter signal associated with the particular actuator signal.

The present invention also relates to an environment control system for use with a VAV box. The VAV box receives air flow from a source and provides air flow to an environment. The VAV box includes a damper for controlling the air flow. The damper is controlled by an actuator. The environment control system includes a first communication bus, a second communication bus, a VAV controller means for controlling the VAV box, a station means for receiving the parameter data from the first communication bus and providing the parameter data on the second communication bus, and computer means for employing diagnostic software. The VAV controller means is operatively associated with the VAV box and includes a parameter input means for receiving a parameter value related to the environment, a communication port coupled with the first communication bus, and an actuator output means for providing an actuator signal to the actuator. The station means is coupled with the second communication bus and the first communication bus. The computer means is operatively couplable to the second communication bus. The diagnostic software causes the computer to communicate with the controller via the first communication bus, the station means and the second communication bus. The diagnostic software causes the computer to receive the parameter data associated with the actuator signal.

The present invention also relates to a diagnostic system for use in environment control systems. The environment control system includes a box unit and a controller operatively associated with the box unit. The box unit includes a damper for controlling air flow to an environment and a parameter sensor for providing parameter data. The controller provides an output signal to position the damper. The diagnostic system includes a communication port operatively couplable to the communication bus and a processor coupled with the communication port. The processor is configured to communicate with the controller and to cause the controller to provide a particular output signal and to receive the parameter data associated with the particular output signal.

Certain aspects of the present invention advantageously provide a response warning, a starved box warning, an oversized box warning, excessive damper hysteresis warning, or a damper stroke out of bounds warning.

In another aspect of the present invention, several VAV boxes may be advantageously tested from a central source.

BRIEF DESCRIPTION OF THE DRAWINGS

The invention will hereafter be described with reference to the accompanying drawings, wherein like numerals denote like elements, and.

DETAILED DESCRIPTION OF THE PREFERRED EXEMPLARY EMBODIMENT OF THE PRESENT INVENTION

Figure 1:
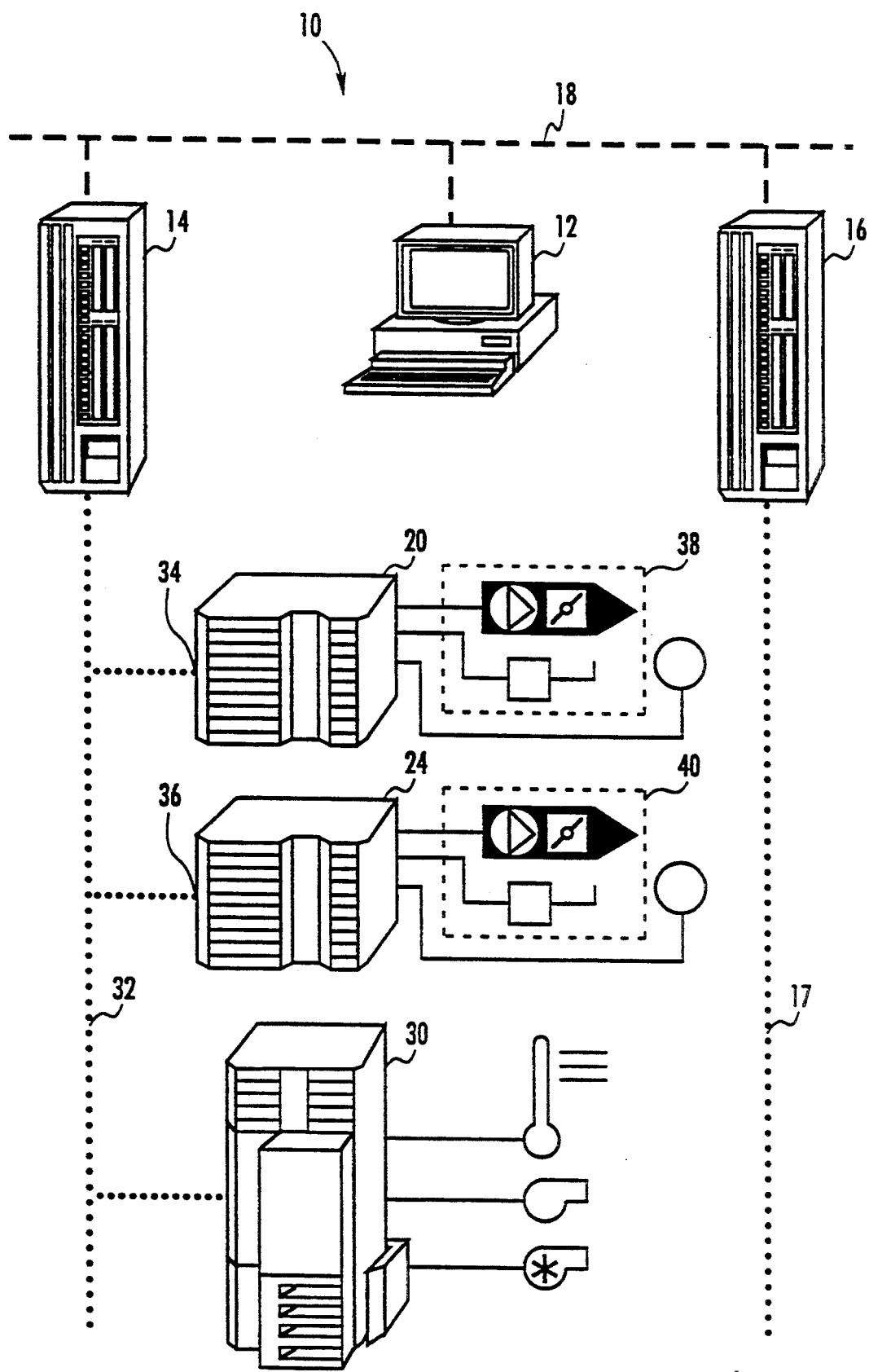
FIG. 1 is a simplified schematic block diagram of an environment control system.

Referring to FIG. 1, an environment control system 10 includes a work station 12, a station 14, a station 16, a controller 20, a controller 24, and a module 30. Controllers 20, 24 and module 30 are coupled with station 14 via a communication bus 32. Work station 12, station 14 and station 16 are coupled together via a communication bus 18. Station 16 is also coupled to a communication bus 17. Communication bus 17 may be coupled to additional sections or additional controllers, as well as other components utilized in environment control system 10.

Preferably, environment control system 10 is a facilities management system such as the Metasys TM system as manufactured by Johnson Controls, Inc. (JCI), the assignee of the present application. Stations 14 and 16 are preferably an NCU station manufactured by JCI, and controllers 20 and 24 are VAV 100-0 TM controllers manufactured by JCI. Module 30 is preferably an air handler control unit (AHU) such as a AHU 102-0 TM unit manufactured by JCI for monitoring and effecting the operation of an air handler (not shown) which provides forced air for system 10.

Communication buses 17 and 32 are N2 buses preferably comprised of a twisted pair of conductors, and communication bus 18 is a LAN (N1) bus for high level communications preferably comprised of a twisted pair of conductors. Bus 18 is a high speed bus using ARC-NET TM protocol. Work station 12 and stations 14 and 16 include ARCNET communication hardware. Buses 17 and 32 utilize RS485 protocol. Controllers 20 and 24, module 30, and stations 14 and 16 include RS485 communication hardware. Preferably, controllers 20 and 24, stations 14 and 16, and work station 12 include communication software for transmitting and receiving data and messages on buses 17, 18 and 32.

Controller 20 is operatively associated with a VAV box 38, and controller 36 is operatively associated with a VAV box 40. Controller 20 communicates with work station 12 via communication bus 32 through station 14 and communication bus 18. Preferably, station 14 multiplexes data over communication bus 32 to communication bus 18. Station 14 operates to receive data on communication bus 32, provide data to communication bus 18, receive data on communication bus 18, and provide data to communication bus 32. Station 14 preferably is capable of other functions useful in environment control system 10. Work station 12 is preferably a PC/AT computer or may be a portable computer unit which is couplable to communication bus 18.

Figure 2:
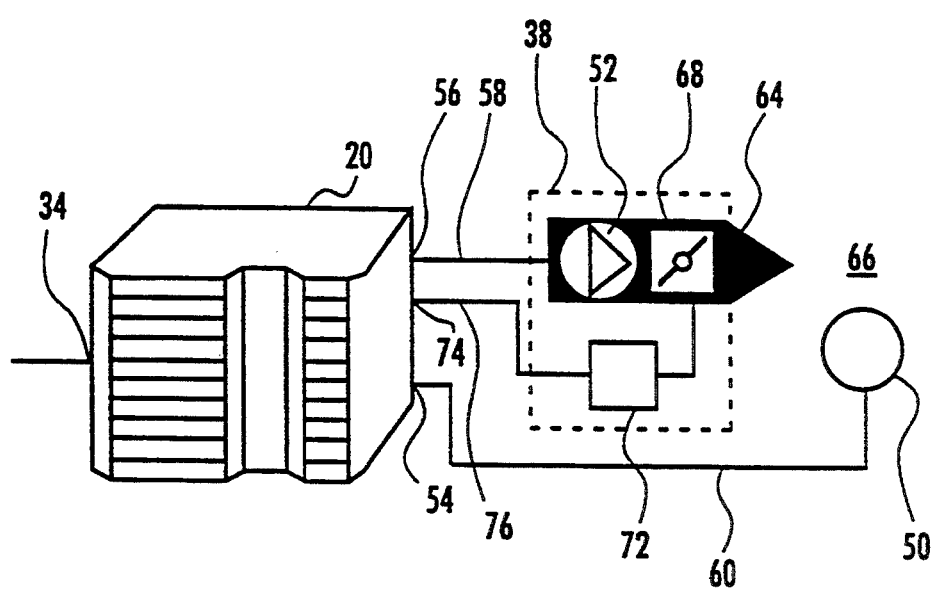
FIG. 2 is a more detailed schematic block diagram of a controller for use in the environment control system illustrated in FIG. 1.

The following is a more detailed description of controller 20 and VAV box 38 with reference to FIG. 2. Controller 20 is preferably a direct digital control (DDC) which includes a communication port 34 coupled with communication bus 32 (FIG. 1). Controllers 20 and 24 preferably include an 80C652 processor, EPROM, E2PROM, and RAM. Controller 20 preferably includes an air flow input 56, a temperature input 54, and an actuator output 74. VAV box 38 may also advantageously include heating or cooling units, or humidifier units (not shown) for treating an air flow 64. Inputs 54 and 56 are preferably analog inputs received by an A/D converter (not shown) in controller 20. Controller 20 preferably includes circuitry and software for conditioning and interpreting the signals on inputs 54 and 56.

VAV control box 38 preferably includes a damper 68, an air flow sensor 52, and an actuator 72. Actuator 72 positions damper 68 and is preferably an electric motor based actuator. Alternatively, actuator 72 and controller 20 may be pneumatic or any other type of device for controlling and positioning damper 68. Actuator 72 is preferably an EDA-2040 TM motor manufactured by JCI having a full stroke time ($T_{stroke}$) of 1, 2, or 5.5 minutes for a 90° stroke.

The position of damper 68 controls the amount of air flow 64 provided to environment 66. Environment 66 is preferably a room, hallway, building, or portion thereof or other internal environment. Air flow sensor 52 preferably provides a parameter such as an air flow parameter across conductor 58 to air flow input 56. The airflow parameter represents the amount of air flow 64 provided through damper 68 to an environment 66.

Controller 20 provides an actuator output signal to actuator 72 from actuator output 74 via a conductor 76. Preferably, the actuator output signals are pulse width signals which cause actuator 72 to move forward, backward, or stay in the same position, and controller 20 internally keeps track of the position of actuator 72 as it is moved. Alternatively, actuator 72 may provide feedback indicative of its position, or the actuator signal may indicate the particular position to which actuator 72 should be moved. Controller 20 receives a temperature signal from a temperature sensor 50 across a conductor 60 at temperature input 54. Temperature sensor 50 is generally a resistive sensor located in environment 66.

Air flow sensor 52 is preferably a differential pressure ($\Delta P$) sensor which provides a $\Delta P$ factor related to airflow (volume/unit time, hereinafter CFM airflow). CFM airflow may be calculated by the following equation:

$$CMF \text{ Air Flow} = 4005 \left( \sqrt{\frac{\Delta P}{K}} \right) \times \text{Box Area} \qquad (1)$$

where: $\Delta P$ is the $\Delta P$ factor from air flow sensor 52;

Box Area is the inlet supply cross section area in square feet; and

K is a CFM multiplier representing the pickup gain of the air flow.

The value K and value of box area are stored in a memory (not shown) in controller 20 when controller 20 is initialized or coupled with VAV box 38. The value of box area is generally in the range of 0.08 to 3.142 feet squared, and the value of K is generally between 0.58 and 13.08. The value of box area and K may be advantageously communicated from controller 20 to work station 12 so that service people do not have to otherwise obtain these values from paper data sheets and files. Air flow sensor 56 is preferably a diaphragm-based pressure sensor.

With reference to FIGS. 1 and 2, the operation of the exemplary embodiment of the present invention is described below as follows. Work station 12 or other computing devices (not shown) are configured to communicate with controller 20 over communication bus 18 through station 14 and communication bus 32 so that controller 20 positions actuator 72 to a particular location by providing the actuator output signal for a particular amount of time. Work station 12 is also configured to receive parameter values associated with particular actuator positions. The parameters values and particular actuator positions are stored in a data file which may be written as described in greater detail below to a disk or other storage device (not shown).

Work station 12 communicates with controller 20 so that actuator 72 positions damper 68 at a fully open position, a fully closed position and various positions in between. Work station 12 analyzes the data file and performs a "flat response" test, a "starved box" test, an "oversize box" test, and an "area out of bounds" test to monitor the air flow characteristics of VAV box 38 on the above described data file. Also, work station 12 is able to analyze the data file to perform actuator tests such as a "damper stroke out of bounds" test, or an "excessive damper hysteresis" test to monitor the performance of actuator 72 as described in greater detail below.

Figure 3:
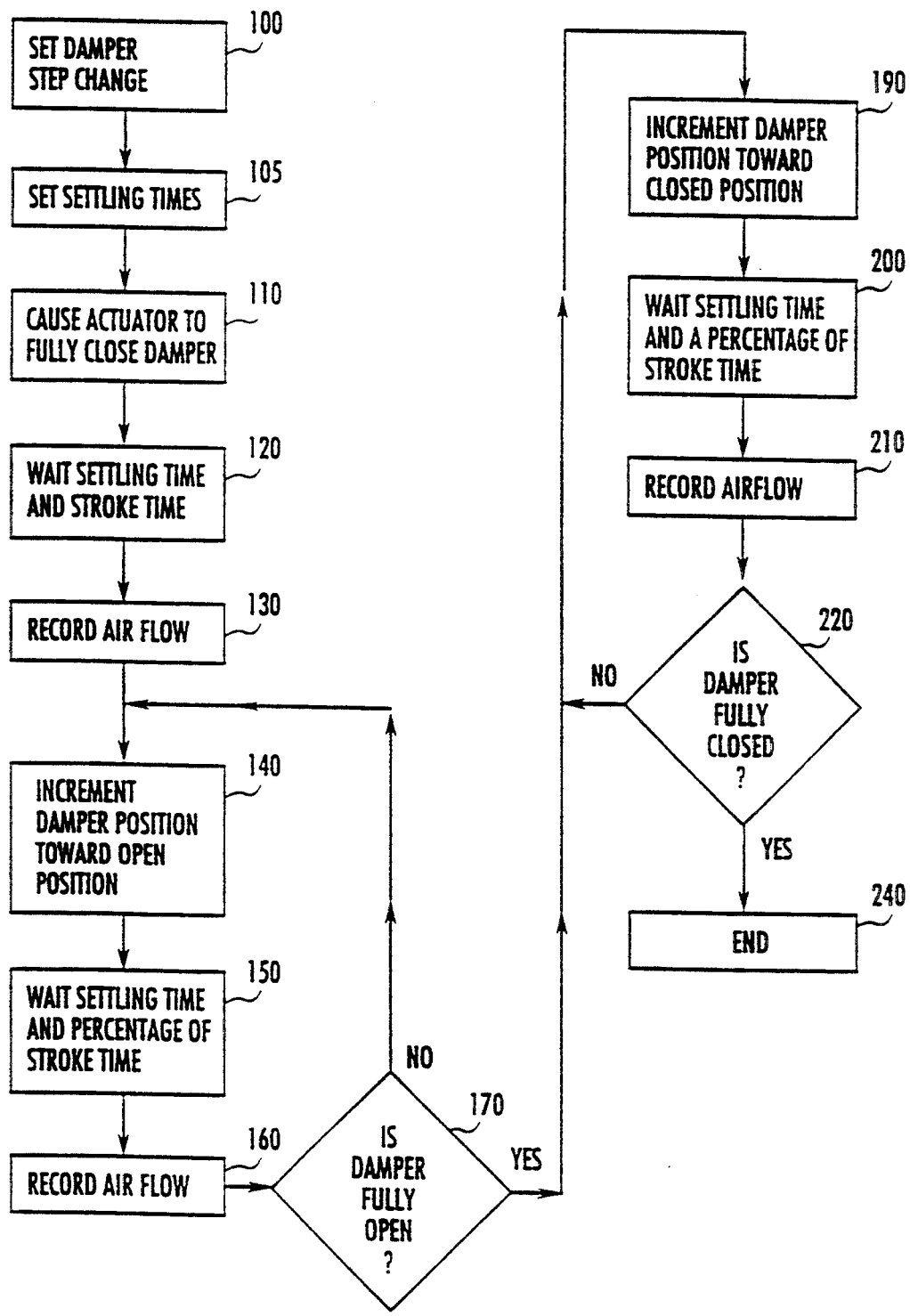
FIG. 3 is a flow chart setting forth the operation of the preferred embodiment of the present invention.

FIG. 3 is a simplified flow chart of the operation of work station 12 in accordance with an exemplary aspect of the present invention. An operator sets damper step changes as shown in a step 100 and provides settling times between the damper step changes as shown in a step 105. Alternatively, the damper step changes and settling times between damper step changes may be provided by software or preset in hardware.

Preferably, the value of the step change is a percentage from 0 to 100. Small values such as 5 are preferably chosen for a detailed test and large values such as 50 or 100 are preferably chosen for a quick test. The smaller the damper step change, the longer the test takes. Setting the step change allows the service people to perform detailed or quick tests as the situation may require.

Settling time is a value in seconds between 0 and 60 seconds. The settling time is selected by picking a value that takes into account communication delays, flow control process stabilization, controller sample period and analog input filter delay. The settling time allows air flow 64 to stabilize after actuator 72 moves damper 68. Generally work station 12 determines the longest stroke times in situations where a variety of dampers 68 have different stroke times. Work station 12 uses this longest value of stroke time for calculating settling times and step changes.

Work station 12 causes damper 68 to be fully closed (0% open) as shown in a step 110. Generally, work station 12 causes controller 20 to provide an actuator signal which causes actuator 72 to approach the fully closed position. Controller 20 provides this actuator signal for an amount of time greater than the stroke time ($T_{stroke}$) to ensure that damper 68 is fully closed. The stroke time is the amount of time required for damper 68 to move from the fully open position to the fully closed position. Alternatively, work station 12 may be configured to cause damper 68 to start at a fully open position (100% open).

Work station 12 is preferably configured to fully close damper 68, then fully open damper 68, and fully close damper 68 again. Samples of both the position of actuator 72 and air flow parameters are taken by work station 12 for each step as damper 68 is fully opened and fully closed. The position of actuator 72 is internally tracked by controller 20.

Work station 12 waits the preset settling time and the stroke time ($T_{stroke}$) as shown in a step 120. The stroke time is stored in a memory (not shown) in controller 20 when controller 20 is initialized or coupled with VAV box 38. Therefore, after the settling time and stroke time have elapsed, work station 12 receives the air flow parameter (CFM air flow value) as shown in a step 130. Preferably, two samples of CFM air flow are received and recorded in a data file or memory. More particularly, controller 20 takes samples of $\Delta P$ at input 56 and calculates two CFM air flow values $CFM_{open\ 1}$ and $CFM_{open\ 2}$ for the samples of $\Delta P$. Controller 20 provides the samples of the CFM air flow values, $CFM_{open\ 1}$ and $CFM_{open\ 2}$, over communication bus 18 through station 14 and communication bus 32 to work station 12. Preferably, the two samples of $\Delta P$ are separated in time so that the samples of $\Delta P$ are not from the same analog-to-digital conversion.

Work station 12 causes controller 20 to increment the position of damper 68 toward the fully open position as shown in a step 140. The position of damper 68 is incremented according to the damper step change entered at step 100. Work station 12 awaits the settling time and percentage of stroke time (step 150). The percentage of stroke time is calculated according to the following equation:

$$Percent\ of\ Stroke\ Time = Damper\ Step\ Change \times T_{stroke} \quad (2)$$

where: damper step change is the percentage change entered at step 100; and $T_{stroke}$ is the full stroke time stored in controller 20.

Next, work station 12 receives a sample of the CFM air flow calculated by controller 20 as shown in a step 160. Preferably, controller 20 calculates the CFM air flow value and communicates this value through communication port 34 to work station 12. Alternatively, work station 12 may receive the $\Delta P$ value from controller 20 and calculate a CFM air flow value according to equation 1.

After the CFM air flow value is received, work station 12 determines if controller 20 has commanded actuator 72 to the fully open position (step 170). If controller 20 has commanded actuator 72 and damper 68 to the fully open position, work station 12 causes controller 20 to increment the position of damper 68 toward the fully closed position as shown in a step 190. Preferably, controller 20 provides two CFM air flow values for the fully open position, $CFM_{open\ 1}$ and $CFM_{open\ 2}$, to work station 12. These two air flow values are calculated by controller 20 from two $\Delta P$ values which are sufficiently separated in time so that they are not from the same analog-to-digital conversion.

If controller 20 has not provided actuator signals to fully open damper 68, as shown in step 170, work station 12 returns to step 140 and increments the position of damper 68 toward the fully open position. This loop is repeated until controller 20 has provided actuator signals to fully open damper 68.

After the loop is completed, work station 12 increments the position of damper 68 so that damper 68 approaches the fully closed position as shown in step 190. Work station 12 awaits the appropriate settling time and stroke time as shown in a step 200. Next, work station 12 receives the CFM air flow value from controller 20 as shown in a step 210.

Work station 12 determines if controller 20 has provided actuator signals to fully close damper 68. If actuator signals to fully close damper 68 have been provided, work station 12 has completed its data collection as shown in a step 240. Controller 20 provides two CFM air flow values for the fully closed position, $CFM_{close\ 1}$ and $CFM_{close\ 2}$, to work station 12. These two air flow values are preferably calculated by controller 20 from two $\Delta P$ values which are sufficiently separated in time so that they are not from the same analog-to-digital conversion.

If controller 20 has not provided actuator signals to fully close damper 68, work station 12 returns to step 190 and causes controller 20 to increment the position of damper 68 toward the fully closed position. This loop is repeated until controller 20 has provided actuator signals for a fully closed position of damper 68.

Work station 12 is able to test at least one VAV box 38 or an entire array of VAV boxes 38 and 40. Preferably, every other VAV box 38 in the array is tested to avoid damage caused by closing all dampers simultaneously. Closing all dampers simultaneously may damage duct work, dampers, actuators, or VAV boxes due to overpressure in system 10. Alternatively, work station 12 automatically alternates every other damper from fully opened to full closed and from fully closed to fully open so that all VAV boxes 38 and 40 may be tested simultaneously. For example, all VAV boxes 38 and 40 on communication bus 32 may be tested by bringing damper 68 of VAV box 38 to a fully closed position while bringing damper 68 of VAV box 40 to a fully open position.

Work station 12 adjusts damper 68 to either open or close at specified increments till full open or full close is achieved. The CFM air flow reading for each incremental step are preferably written to a disk or other storage device. Work station 12 can analyze the data to provide flat box warnings, starved box warnings as well as other warnings.

Work station 12 matches the warnings with the appropriate VAV box 38 and lists the VAV boxes 38 and 40 (flags the VAV boxes) which may be malfunctioning. The listing is provided to a screen or printer of work station 12. The data is preferably formatted so that it can be directly imported into a spreadsheet program (e.g. Excel TM) for graphing. Thus, service people may advantageously analyze the operation of VAV boxes from a remote source.

The various diagnostic warnings are discussed below. Generally, work station 12 operates to analyze the data collected according to the flow chart illustrated in FIG. 3. The values $CFM_{open\ 1}$, $CFM_{open\ 2}$, $CFM_{close\ 1}$ and $CFM_{close\ 2}$ are particularly useful in determining VAV box air flow characteristics. Work station 12 may provide a diagnostic warning for each VAV box 38 according to the following tests.

Flat Response Test

A flat response is indicative that air flow is not changing as controller 20 changes the position of actuator 72. For example, a flat response could be caused by a failure of air flow supply to VAV box 38, a failure of actuator 72 to move damper 68, a failure of damper 68 to restrict or allow air flow, a failure of air flow sensor 52, a fire or isolation damper (not shown) in VAV box 38 being closed, or a failure in the duct system (not shown). Preferably, a flat response warning is provided by work station 12 according to equation 3. There is a Flat Response Warning when:

$$AVG(CFM_{open1},\ CFM_{open2}) - AVG(CFM_{close1},\ CFM_{close2}) < 0.1 \times OCC\ CFM_{max} \quad (3)$$

where: $OCC\ CFM_{max}$ is the estimated occupied CFM air flow maximum for VAV box 38.

$OCC\ CFM_{max}$ is preferably stored in memory (not shown) in controller 20 when controller 20 is initialized or coupled with VAV box 38.

Starved Box Test

A starved box condition is indicative of insufficient air flow to VAV box 38. A starved box condition may be caused by an air supply fan malfunction, poor box inlet conditions caused by duct expansion, sharp turns in the duct system, or a error in a $\Delta P$ sensor 52.

Preferably, a starved box warning is provided by work station 12 according to equation 4. There is a Starved Box Warning when:

$$0.9\ OCC\ CFM_{max} > AVG(CFM_{open1},\ CFM_{open2}) \quad (4)$$

A starved box warning should not be provided if a flat response warning is provided according to Equation 3 because flat response conditions are mutually exclusive of starved box conditions.

Oversized Box Test

An oversized box condition may be caused by an error in the supply system design for system 10, or a balancing error. Preferably, an oversized box warning is provided by work station 12 according to equation 5. There is an Oversized Box Warning when:

$$OCC\ CFM_{max} \leq \frac{AVG(CFM_{open1}, CFM_{open2})}{3} \quad (5)$$

Area Out of Bounds Test

An area out of bounds test may be caused by an entry error when inputting the area of VAV box 38, or an unusually large or small VAV box 38. Preferably, an area out of bounds warning is provided by work station 12 according to equation 6. There is an Area Out of Bounds Warning when:

$$Area < 0.08\ ft.2\ OR\ AREA > 3.5\ ft.2 \quad (6)$$

where: Area is the area of VAV box 38 stored in controller 20 when system 10 is initiated or VAV box 38 is coupled with controller 20.

CFM Multiplier (K) Out of Bounds

CFM multiplier (K) out of bounds may be caused by a typographical or entry error, or a balancing error. A CFM multiplier (K) out of bounds warning is provided by work station 12 according to equation 7. There is a CFM Multiplier (K) Out of Bounds When:

$$K < 0.58\ OR\ K > 13.08 \quad (7)$$

The limits 0.58 and 13.08 are derived from Equation 1. Generally, K values should be in the range of 1.31 to 3.27. However, errors in the CFM air flow are assumed to be less than 50%. Therefore, if the CFM air flow would be decreased by 50%, K would have to be increased 4 times, and if the CFM air flow were increased by 50% K would have to be decreased by the square of $\frac{2}{3}$, or 0.444. Therefore, the expected range for K is between 0.58 and 13.08.

Work station 12 may also be utilized to perform tests to monitor the operation of actuator 72. For example, work station 12 may cause controller 20 to position actuator 72 at various positions and record CFM air flow at these positions. Analysis of this data can provide significant information about the condition of actuator 72. A particularly useful actuator 72 test is an excessive damper hysteresis test described below.

Excessive Damper Hysteresis Test

Figure 4:
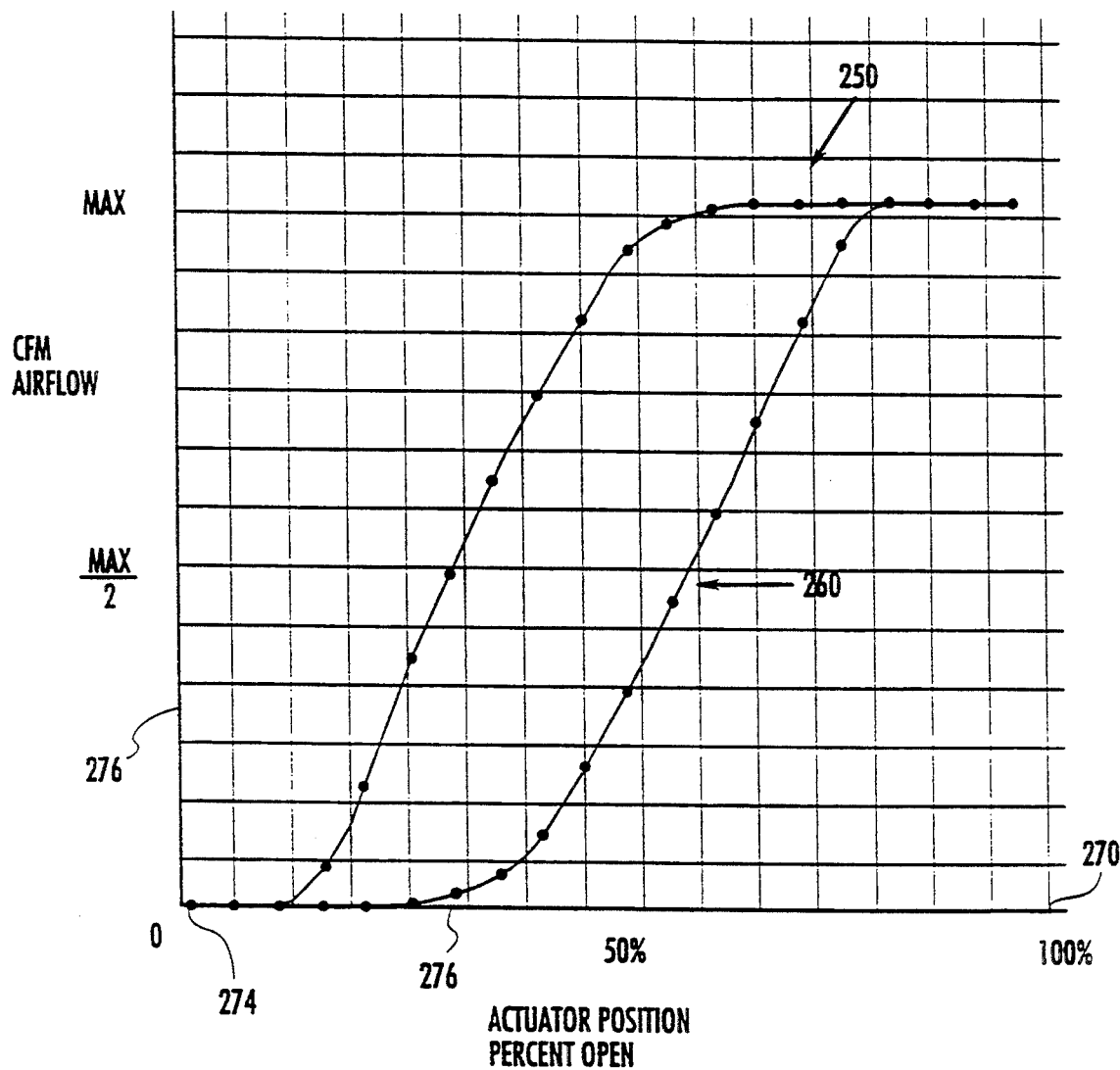
FIG. 4 is a graph showing a closing response and opening response for a VAV box illustrated in FIG. 1.

With reference to FIG. 4, work station 12 obtains 20 data points for an opening response 250 (from a fully closed position to a fully open position) and 20 data points for a closing response 260 (from a fully open position to a fully closed position). These 40 data points represent the actuator position expressed as a percentage of being opened, and the CFM air flow value at that position. Preferably, the percentage of actuator position is associated with an X axis 270, and the CFM air flow is associated with the Y axis 272.

An excessive damper hysteresis condition may be caused by an actuator 72 failure, an actual damper travel time less than that programmed, or a nonsymmetrical actuator interface. An excessive damper hysteresis condition indicates that damper 68 is opening more quickly than it is closing or closing more quickly than it is opening. In this test, work station 12 preferably analyzes data from the 40 data points. Preferably, an excessive damper hysteresis warning is provided by work station 12 according to the following method:

1. Work station 12 performs linear regressions to find least squares fit for the 40 data points.
2. Work station 12 calculates an X intercept 274 of closing response 250, and an X intercept 276 of opening response 260.
3. Work station 12 provides an excessive damper hysteresis warning if the difference between X intercept 274 and X intercept 276 is greater than 15%, or if the slope of closing response 260 and the slope of opening response 260 differ by more than 15% of the greater slope.

Alternatively, an excessive damper hysteresis warning is provided by work station 12 according to the following method:

1. The total change in CFM air flow values from fully open to fully closed is determined for opening response 250 and the closing response 260.
2. For the response with the greater change in CFM air flow, work station 12 calculates the air flow values for 20%, 50%, and 80% of the greater change in CFM air flow.
3. Work station 12 utilizes look-up tables and linear interpolation to find the corresponding damper positions for both opening response 250 and closing response 260 for the calculated air flow values.
4. Work station 12 compares the resulting pairs of damper positions to determine if the curves are converging, parallel, or diverging. If the pairs are not parallel or if their average position difference is greater than 15%, work station 12 provides an excessive damper hysteresis warning.

Damper Stroke Out of Bounds Tests

A damper stroke out of bounds condition may be caused by entry error for the stroke time ($T_{stroke}$) or a non-conforming actuator 72. The stroke time is preferably stored in a memory (not shown) in controller 20 when controller 20 is initialized or coupled with VAV box 38. Generally, damper 68 has a stroke of 45, 60, and 90 degrees. The valid stroke time for a typical actuator 72 such as an EDA 2040 motor are 0.5, 0.67, 1, 1.33, 2, 2.75, 3.67, 5.5. Work station 12 provides a damper stroke out of bounds warning when:

$$T_{stroke} < 0.5\ OR\ T_{stroke} > 5.57 \quad (8)$$

Alteratively, work station 12 may provide a damper stroke out of bounds warning when:

$$T\ Stroke \neq 0.5,\ 0.67,\ 1,\ 1.33,\ 2,\ 2.75,\ 2.67,\ 5.5 \quad (9)$$

Preferably, work station 12 is configured by software written in C computer language for a PC/AT computer. Exemplary pseudo software is attached hereto as Appendix A. The pseudo-software enables basic data collection operations and test operations for system 10.

Alternatively, a hardware control circuit, or other software may be utilized to collect data from controller 20 and perform the various diagnostic tests.

It is understood, that while the detailed drawings and specific examples given describe a preferred exemplary embodiment of the present invention, they are for the purpose of illustration only. The invention is not limited to the precise details and conditions disclosed. For example, although factors such as OCC $CFM_{max}$, K, and $T_{stroke}$ are stored in controller 20, these factors may also be stored in work station 12, station 14, or other memory in system 10. Also, although particular facility management systems and components are suggested, the diagnostic system may be configured for various other HVAC systems. The system may easily be configured to utilize metric units. Also, single lines in the various Figures may represent multiple conductors. Various changes may be made to the details disclosed without departing from the spirit of the invention which is defined by the following claims.

```
BOOL FAR PASCAL VAVN2FlowProc(hDlg, message,
wParam, lParam)
HWND hDlg;
unsigned message;
WORD wParam;
LONG lParam;
CASE incoming message of
    WM_INITDIALOG
        Default the comm status to OK
        Set the window title
        Start polling for devices
        Set the top text to Checking device at address x
        Set the text to Cancel or Spacebar to stop
        Read the tab stops from the language file.
        CALL ShowProgress() with parts==0 this will initialize
        And let the user know we are getting started
        Set the meter text to scanning for controllers . . .
        FOR all of the N2 address space
            Initialize the comm port
            Send the identify yourself message
            IF there is a response from a VAV controller
                Get the user blocks
                IF this is a release 4.00 configuration AND
                this is Single Duct application revision 2 AND
                this is Pressure Independent with BO outputs
                    Alternate the Start Command between
                    0 and 100
                Put the address in the buffer
                Add the start command to the string
                Read the damper command from the
                controller
                Read the CFM value from the controller
                Read the Delta P value from the controller
                Add the entry to the listbox
        Set the ending text
        Enable OK
    WM_TIMER
        IF delays are in progress
            IF the user selected cancel
                Stop everything
                Let the user exit
            ELSE
                Refresh the meter
                Set the timer again
            return TRUE
        Kill Active Timers
        IF there are more steps
            Update the meter to indicate the step
            FOR all the devices that are being tested
                Update the meter
                Set the selection to the one we are on
                Tell comhndlr the address
                Read the data from the controller and update the
                screen
                IF the damper is not where it should be
                    Overrides are not working so tell the user
                IF there are more steps to be taken
                    IF we are going up the curve
                        Add the flow step to the command
                        IF we are at 100 then go down
                    ELSE we are going down the curve
                        Subtract the flow step to the command
                        IF we are at 0 then go up
                    Command the damper to the new value
                    Update the screen with the new command
                IF there is a communication error
                    Stop the test
            Increment the step we are on
            IF there are more steps
                Update the meter for the next step
                Set the delay time based on the actuator stroke
                time and settle time
                Fire off the timer
            ELSE
                Release all the dampers
                Kill Communications
                Log the flow test values, each command and the
                CFM at that value
                Analyze the Flow Test Results to determine a status
                FOR all the tested devices
                    Default the status to OK
                    Calculate the number of steps taken
                    Get the full open value
                    Get the full close value
                    Subtract the two to get the change
                    Take the absolute value
                    IF the CFM did not change by at least 10% of
                    the max then err of FLAT RESPONSE is
                    generated
                    ELSE IF the CFM at max is not at least 90%
                    of MAX then error of STARVED BOX is
                    generated
                    Write the status to the log file
                Ask the user if he wants to see the log
                IF yes then bid notepad to show it to him
                Let the user Exit
    WM_COMMAND
        CASE incoming command of
            DEVL_REMOVE:
                If we are not polling or testing
                    Remove the selected item from the listbox
            TOGGLE_START:
                IF we are not polling or testing
                    Toggle the start command between 0
                    and 100 for the selected device
            ID_OK
                IF we are not polling or testing
                    Show a Warning like
                    "Warning: Danger of duct over pressure
                    exists. The starting commands can be changed
                    to equalize the load on each fan system.
                    Continue?",
                    IF the user selects not to continue then get out
                    Start the test
                    Calculate the number of steps
                    Set up the meter and memory
                    FOR all devices being tested
                        Tell comhndlr the device address
                        Command the damper to the start position
                        Get other data I will need
                            Stroke Time and Occ Clg Max
                    Set the time delay based on the maximum
                    stroke time and settle time
                    Fire off the timer
            ID_CANCEL
                IF we are not polling or testing
                    End the dialog box
                ELSE set a cancel flag and wait for the timer
            default case
                Pass message to default dialog processing
    default case
        Pass message to default dialog processing
return TRUE to indicate message was processed
```

We claim:

1. An environment control network, comprising:
a plurality of box units, each of said plurality of box units having a controller operatively associated with said box unit, said box unit including a damper driven by an actuator, said damper controlling air flow to an environment, said box unit being coupled to a sensor for providing a parameter signal, each controller including a parameter input, coupled to said sensor, for receiving the parameter signal and an actuator output coupled with said actuator, said controller providing an actuator signal at said actuator output to position said actuator;

a communication bus coupled to each said controller; and a computer operatively couplable with said communication bus, said computer configured to cause said controller to position said actuator to a plurality of particular positions, said computer configured to receive a plurality of particular parameter signals associated with said plurality of particular positions, wherein said computer is configured to display said plurality of particular positions with said plurality of parameter signals.

2. The environment control network of claim 1 wherein said parameter signal is related to said air flow.

3. The environment control network of claim 2 wherein said computer is configured to cause said controller to provide a plurality of actuator test signals representative of a plurality of tests actuator positions of said actuator and to receive from said sensor a plurality of test parameter signals associated with said test actuator positions, said controller providing said plurality of test parameter signals to said computer.

4. The environment control network of claim 3 wherein said computer is configured to provide an excessive damper hysteresis warning in response to linear regression analysis of said test parameter signals.

5. The environment control network of claim 1 wherein said computer is configured to position said actuator to a first particular position to fully open said damper and a second particular position to fully close said damper.

6. The environment control network of claim 5 wherein said computer is configured to receive a first particular parameter signal associated with said first particular position and a second particular parameter signal associated with said second particular position.

7. The environment control network of claim 1 wherein said computer is configured to cause said controller to fully open said actuator at a first time and fully open said actuator at a second time and wherein said computer is configured to receive a first particular parameter data associated with said first time and a second particular parameter data associated with said second time.

8. An environment control network, comprising:

a plurality of box units, each of said plurality of box units having a controller operatively associated with said box unit, said box unit including a damper driven by an actuator, said damper controlling air flow to an environment, said box units being coupled to a sensor for providing a parameter signal, each controller including a parameter input, coupled to said sensor, for receiving the parameter signal and an actuator output coupled with said actuator, said controller providing an actuator signal at said actuator output to position said actuator;

a communication bus coupled to each said controller; and a computer operatively couplable with said communication bus, said computer configured to cause said controller to position said actuator to a particular position, said computer configured to receive a particular parameter signal associated with said particular position, wherein said computer is configured to receive a first particular parameter signal associated with a fully open position of said damper and a second particular parameter signal associated with a fully closed position of said damper, wherein said computer is configured to provide a flat response warning in response to a comparison of said first particular parameter signal and said second particular parameter signal.

9. An environment control network, comprising:

a plurality of box units, each of said plurality box units having a controller operatively associated with said box unit, said box unit including a damper driven by an actuator, said damper controlling air flow to an environment, said box unit be coupled to a sensor for providing a parameter signal, each controller including a parameter input, coupled to said sensor, for receiving the parameter signal and an actuator output coupled with said actuator, said controller providing and actuator signal at said actuator output to position said actuator;

a communication bus coupled to each said controllers; and a computer operatively couplable with said communication bus, said computer configured to cause said controller to position said actuator to a particular position, said computer configured to receive a particular parameter signal associated with said particular position, wherein said computer is configured to cause said controller to fully open said actuator at a first time and fully open said actuator at a second time and wherein said computer is configured to receive a first particular parameter data associated with said first time and a second particular parameter data associated with said second time, wherein said computer is configured to provide a starved box warning in response to a comparison of said first particular parameter data and said second particular parameter data.

10. An environment control network, comprising:

a plurality of box units, each of said plurality box units having a controller operatively associated with said box unit, said box unit including a damper driven by an actuator, said damper controlling air flow to an environment, said box unit being coupled to a sensor for providing a parameter signal, each controller including a parameter input, coupled to said sensor, for receiving the parameter signal and an actuator output coupled to said actuator, said controller providing an actuator signal at said actuator output to position said actuator;

a communication bus coupled to each said controller; and a computer operatively coupled with said communication bus, said computer configured to cause said controller to position said actuator to a particular position, said computer configured to receive a particular parameter signal associated with said particular position, wherein said computer is configured to cause said controller to provide at said actuator output a plurality of actuator test signals representative of a plurality of test actuator positions of said actuator and to receive from said sensor a plurality of test parameter signals associated with said test actuator positions, said controller providing said plurality of test parameter signals to said computer, wherein said computer is configured to provide an excessive damper hysteresis warning in response to an analysis of said plurality of test parameter signals.

11. The environment control network of claim 10 wherein said computer is configured to perform linear regressions during said analysis.

12. The environment control network of claim 11 wherein said computer is configured to provide a damper stroke out of bonds warning in response to $T_{stroke}$ values stored in said controller.

13. An environment control system for use with a VAV box, said VAV box receiving airflow from a source and providing said air flow to an environment, said VAV box including a damper for controlling said air flow, said damper being controlled by an actuator, said environment control system comprising:
 a first communication bus;
 a second communication bus;
 a VAV controller operatively associated with said VAV box, to control said VAV box, said VAV controller means including a parameter input means for receiving a parameter value related to said environment, a communication port coupled with said first communication bus, and an actuator output means for providing an actuator signal to said actuator, said VAV controller means positioning said actuator in response to said actuator signal;
 station means, coupled with said second communication bus and said first communication bus, for receiving said parameter data from said first communication bus and providing said parameter data on said second communication bus; and
 computer means, operatively couplable to said second communication bus, for employing diagnostic software, said diagnostic software causing said computer to communicate with said controller via said first communication bus, said station means, and said second communication bus, said diagnostic software causing said computer to receive said parameter data associated with a position of said actuator, wherein said computer means receives a first parameter data associated with said damper in a fully open position and a second parameter data associated with said damper in a fully closed position in response to said diagnostic software, and wherein said computer means provides a starved box warning, an oversized box warning, an excessive damper hysteresis warning, or a flat response warning in response to said first parameter data and said second parameter data.

14. The environment control system of claim 13 wherein said parameter value is related to said air flow.

15. The environment control system of claim 14 wherein said parameter data is related to temperature in said environment and said air flow.

16. The environment control system of claim 13 wherein said first communication bus is an RS485 bus.

17. A diagnostic system for use in an environment control system, said environment control system including a box unit and a controller operatively associated with said box unit, said box unit includes a damper, said damper controlling air flow to an environment, and a parameter sensor for providing parameter data, and said controller for providing an output signal to position said damper, said diagnostic system comprising:
 a communication port operatively couplable to said communication bus; and
 a processor coupled with said communication port, said processor configured to communicate with said controller, said processor configured to cause said controller to provide a particular output signal and to receive said parameter data associated with said particular output signal, wherein said processor is configured to cause said controller to receive a first parameter data associated with said output signal representative of a first fully opened position of said damper and a second parameter data associated with said output signal representative of a second fully opened position of said damper, wherein said processor provides a starved box warning or an oversized box warning in response to said first parameter data and said second parameter data.

18. The diagnostic system of claim 17 wherein said parameter data is air flow in said environment.

19. The diagnostic system of claim 17 wherein said processor is configured to cause said controller to position said actuator in a plurality of particular positions and for receiving a plurality of parameter data associated with said particular positions.

20. A diagnostic system for use in an environment control system, said environment control system including a box unit and a controller operatively associated with said box unit, said box unit including a damper, said damper controlling air flow to an environment, and a parameter sensor for providing parameter data, and said controller for providing an output signal to position said damper, said diagnostic system comprising:
 a communication port operatively couplable to said communication bus; and
 a processor coupled with said communication port, said processor configured to communicate with said controller, said processor configured to cause said controller to provide a particular output signal and to receive said parameter data associated with said particular output signal, wherein said processor is configured to cause said controller to position said actuator in a plurality of particular positions and to receive a plurality of parameter data associated with said plurality of particular positions, wherein said processor is configured to display said plurality of particular positions with said plurality of particular parameter data.

* * * * *